United States Patent [19]

Nakano et al.

[11] Patent Number: 5,321,688

[45] Date of Patent: Jun. 14, 1994

[54] METHOD AND APPARATUS FOR TRANSMISSION OF FAILURE INFORMATION OF VIRTUAL PATH IN ATM NETWORK

[75] Inventors: Yukio Nakano, Hachioji; Yoshihiro Ashi, Yokohama, both of Japan

[73] Assignee: Hitachi, Ltd., Tokyo, Japan

[21] Appl. No.: 791,504

[22] Filed: Nov. 14, 1991

[30] Foreign Application Priority Data

Nov. 16, 1990 [JP] Japan .................................. 2-308905

[51] Int. Cl.⁵ .............................................. H04L 1/24
[52] U.S. Cl. ..................... 370/14; 370/110.1; 371/20.1
[58] Field of Search .................. 370/13, 14, 53, 58.2, 370/110.1; 340/825.16; 371/20.1, 20.2; 375/3.1, 10

[56] References Cited

U.S. PATENT DOCUMENTS

| | | | |
|---|---|---|---|
| 4,961,180 | 10/1990 | Schwartz et al. | 370/13 |
| 5,058,104 | 10/1991 | Yonehara et al. | 370/14 |
| 5,128,924 | 7/1992 | Bihan | 370/13 |
| 5,170,391 | 12/1992 | Arnold et al. | 370/13 |

Primary Examiner—Benedict V. Safourek
Attorney, Agent, or Firm—Antonelli, Terry, Stout & Kraus

[57] ABSTRACT

A method for transmitting virtual path failure information in an asynchronous transfer mode network the method includes performing search against a table storing virtual paths being used for generating failure indicative cells for respective ones of the virtual paths when failure of a transmission line is detected. The generated failure indicative cells are transmitted to all of the other apparatuses connected in downstream signal transmitting directions through the virtual path sequentially for a number of predetermined times, and subsequently, intermittently with an interval of a given period of time. When failure is removed, a normal cell is immediately transmitted.

16 Claims, 7 Drawing Sheets

METHOD AND APPARATUS FOR TRANSMISSION OF FAILURE INFORMATION OF VIRTUAL PATH IN ATM NETWORK

BACKGROUND OF THE INVENTION

The present invention relates to a method and apparatus for transmitting failure information of a virtual path in an ATM network for all of repeaters and receivers connected downstream of signal transmission direction, which repeaters and receivers will be hereafter referred to in general as "downstream device".

In the transmission networks, when failure is detected at the multiplexed level, a signal, so called an AIS (alarm indication signal) is transmitted to downstream devices of multiplexed paths, so as to prevent failure from propagating. For example, as discussed in Teranishi and Kitamura "Design of Digital Network Transmission Installation", page 32, *Electrical Communication Association*, 1984, AIS is transmitted by making all multiplexed paths marked.

However, in ATM (Asynchronous Transfer Mode), since a virtual path which corresponds to the multiplexed path, is identified by the header of a cell, AIS has to be transferred in a form of the cell, as discussed in Ohta, Hadama and Satoh "Operation and Maintenance Information in ATM-based transport Networks", 1989 National Conference in Autumn of the Institute of Electronics, Information and Communication Engineers, B-261. The cell used for transferring the maintenance signals, such as AIS, is called as "OAM (operation and maintenance) cell".

When AIS is transferred with the OAM cell, the transfer frequency of OAM cells has to be set optimally. In general, the bandwidth which is assigned to the virtual path has a wide range such as from tens k b/s to tens M b/s. In particular, when the assigned bandwidth is narrow, there is a possibility that the bandwidth of the OAM cells could increase beyond the assigned bandwidth. When the AIS transferring OAM cells is transmitted with a velocity which is beyond the nominal capacity of the assigned virtual path, since the virtual path assigned for the AIS is multiplexed with other virtual paths in the downstream devices, the bandwidths of the other virtual paths are disturbed by the OAM cells. This possibly causes an increase in cell loss ratio.

Figure 1:
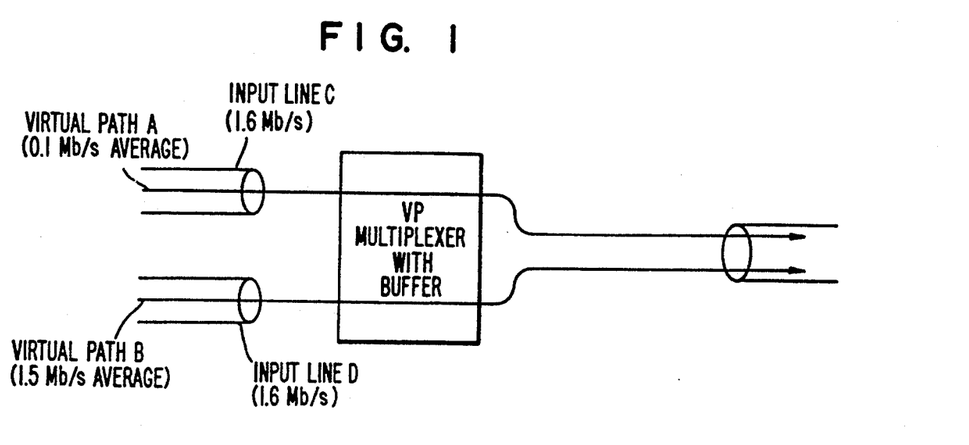
FIG. 1 is an explanatory illustration showing capacity of virtual paths.

For instance, as shown in FIG. 1, assuming that a virtual path A having an average capacity of 0.1 Mb/s and a virtual path B having an average capacity of 1.5 Mb/s are accommodated in input lines C and D, each having 1.6 Mb/s capacity, and that the virtual paths A and B are multiplexed in an output line of 1.6 Mb/s capacity. In an ATM multiplexer, a cell buffer is used to store the cells, when the sum of the instantaneous cell rates becomes higher than the output line capacity for a short time.

In FIG. 1, if the average rate of the OAM cells for the virtual path A from the input line C becomes higher than 0.1 Mb/s for a period longer than the short time mentioned above, the cells of the virtual path B will be discarded, because a total input cell rate higher than 1.6 Mb/s makes the cell buffer full. As a result, cell loss ratio at other virtual path becomes higher. On the other hand, when the transfer frequency of the AIS transferring OAM cell is set to be too low, delay in detection of AIS may be caused due to overlooking of the OAM cell in the downstream devices in the virtual path upon occurrence of failure.

SUMMARY OF THE INVENTION

Therefore, it is an object of the present invention to provide a method and apparatus for transferring an OAM cell carrying an AIS which may not disturb other normal virtual path bands at the downstream of a virtual path, assures instant detection of AIS at the downstream device upon occurrence of failure.

In order to accomplish aforementioned object, the present invention transmits failure information of all multiplexed virtual paths in a transmission line upon failure toward downstream devices which the virtual paths go through. AIS transferring cells are transmitted sequentially or repeatedly for a predetermined number of times immediately after detection of failure, and are intermittently transmitted thereafter while failure is maintained.

Accordingly, since the downstream devices in respective of the virtual paths ma receive at least one of AIS transferring cells transmitted for a given times within a short period. Subsequently, a transmission device in the vicinity of the point, at which failure is caused, transmits the AIS transferring cells intermittently to the downstream devices in the virtual paths while failure is maintained. Therefore, it will never caused to disturb of other normal virtual paths of the downstream devices.

According to the present invention, since the OAM cells carrying VP-AIS are repeatedly transmitted for all of the virtual paths in use immediately after occurrence of failure, the failure can be certainly detected by the downstream devices in the virtual paths. Since the OAM cells carrying the AIS are transmitted intermittently in the subsequent period, the transmission rate of the OAM cell can be maintained at sufficiently low so that the bands of other normal virtual paths will never be disturbed in the downstream devices in the virtual paths

DESCRIPTION OF THE PREFERRED EMBODIMENT

Figure 2:
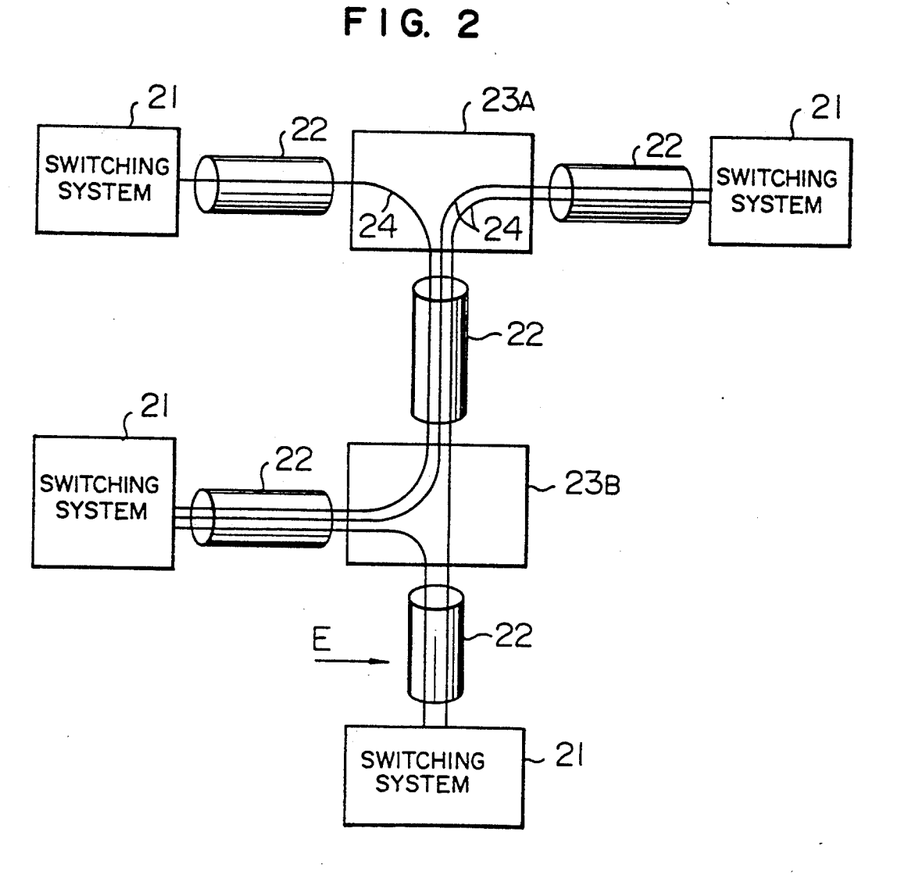
FIG. 2 is a schematic diagram of an ATM network.

FIG. 2 shows one embodiment of an ATM network, for which the present invention is applicable.

In FIG. 2, the reference numeral 21 denotes a switching system, 22 denotes a transmission line, 23A and 23B denote transmission devices in the identical constructions to each other. By the transmission devices 23A and 23B, a plurality of virtual paths 24 are set in the transmission line 22.

When the transmission line 22 as identified by an arrow E becomes not available due to failure or for maintenance, cell synchronization of the input signals from the transmission line 22 as identified by the arrow E cannot be obtained at the transmission device 23B. Therefore, the transmission device 23B detects failure in the transmission line. Then, the transmission device 23B generates OAM cell containing AIS information for transmitting to downstream devices in order to notice the occurrence of failure.

Figure 3:
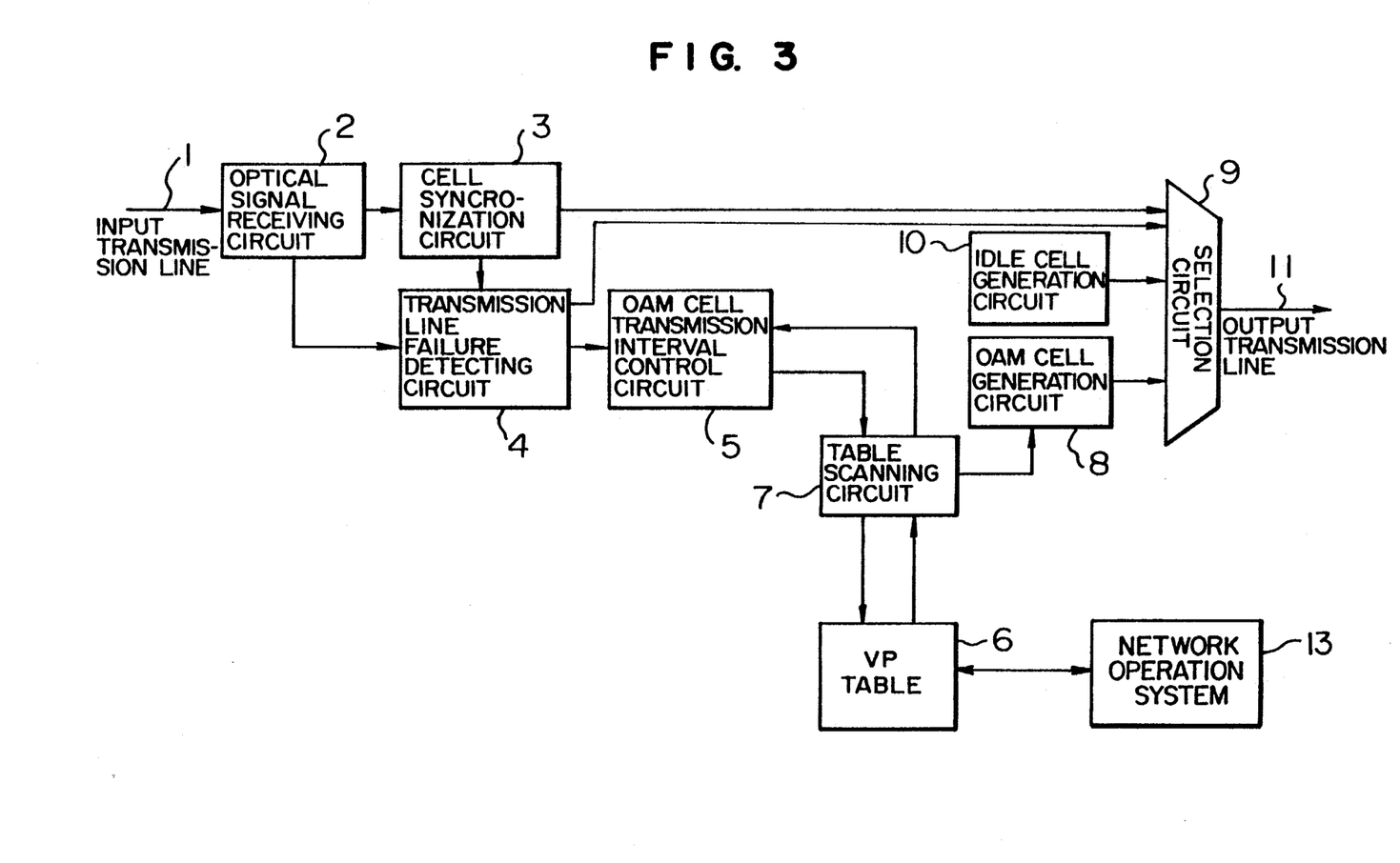
FIG. 3 is a block diagram of the first embodiment of the present invention.

FIG. 3 shows a first embodiment of the transmission device according to the present invention. The first embodiment of the transmission device comprises an input transmission line 1, an optical signal receiving circuit 2, a cell synchronization circuit 3, and a transmission line failure detecting circuit 4, an OAM cell transmission interval control circuit 5, a VP (virtual path) table 6, a table scanning circuit 7, an OAM cell generation circuit 8, a selection circuit 9, an idle cell generation circuit 10, and an output transmission line 11. The VP table 6 is constituted of 4096 words. Each word corresponds to virtual path so that the address of each words coincides with 12 bit identifier (hereafter referred to as "") of virtual path on the input transmission line 1. Each word stores information whether the virtual path having the corresponding VPI is designated or not. The information to be stored in the VP table 6 is written and updated by the network operation system 13 to which the VP table 6 is connected. The operation system 13 can designate maximum 4096 virtual paths in a transmission line. The number 4096 corresponds to a bit number (12 bit) of the VPI. Actually, the operation system 12 designates a part of the 4096 virtual paths. The operation system 13 writes information as to whether or not the virtual path is designated, in a region of the VP table which is addressed by an input VPI of a virtual path to be designated.

The transmission device in the shown embodiment is designed for performing respective steps of processing by hardware construction since high speed processing of signals is required. However, the equivalent device may also be realized by high speed processing by CPU.

Figure 4:
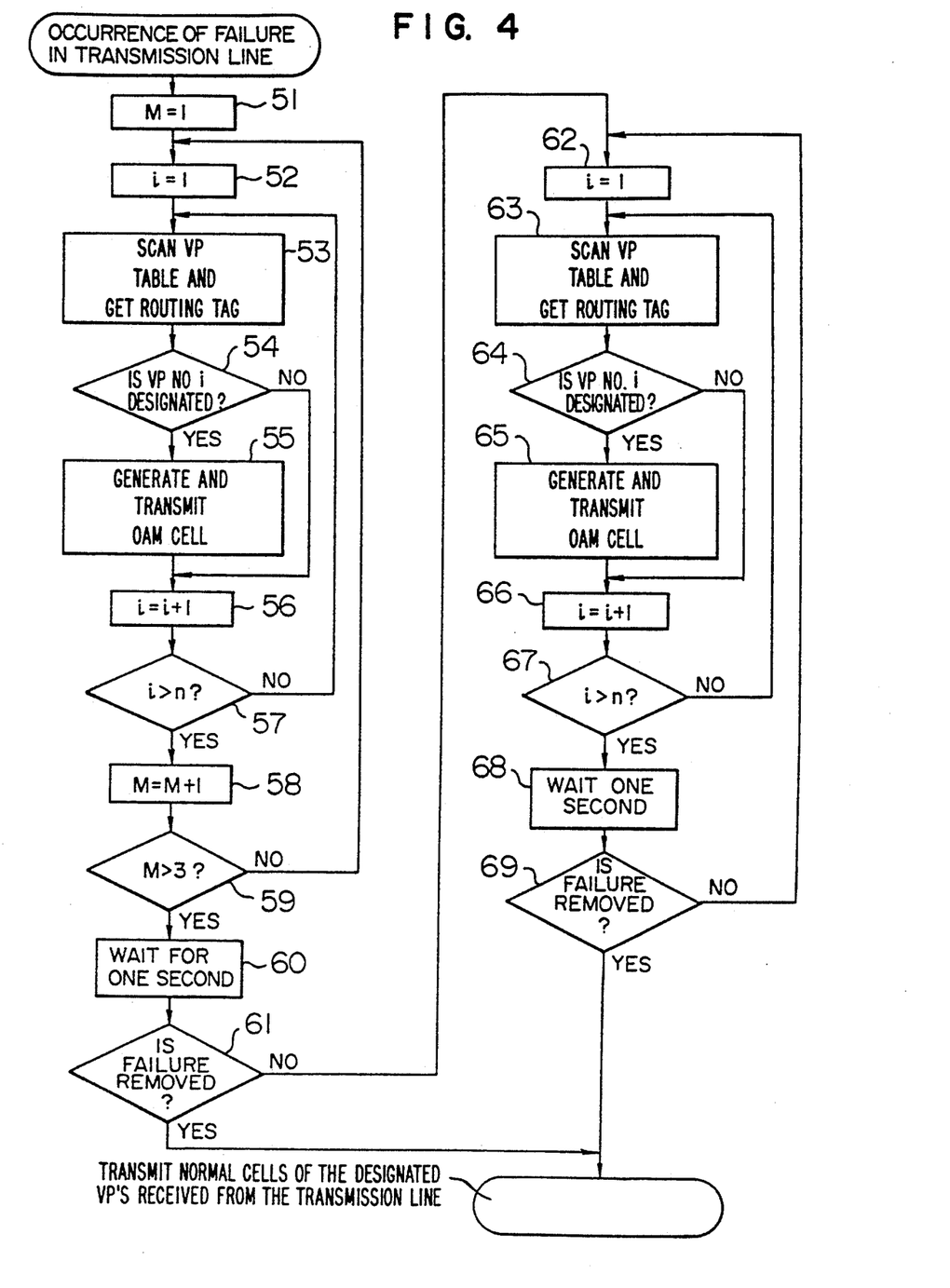
FIG. 4 is a flowchart showing operation of the circuit of FIG. 3.

The operation of the first embodiment will be discussed herebelow. FIG. 4 shows a flowchart of the process to be performed by the transmission device of FIG. 3. The optical signal receiving circuit 2 converts an optical signal from the input transmission line 1 into an electric signal and supplies to the cell synchronization circuit 3. The optical signal receiving circuit 2 detects the input optical signal level lower than or equal to a reference level to supply a transmission line failure alarm to the transmission line failure detecting circuit 4. The cell synchronization circuit 3 establishes synchronization of cell utilizing correlation of header inspection sign. When cell is out of synchronization, an out of synchronization alarm is output to the transmission line failure detecting circuit 4. When the transmission line failure alarm from the optical signal receiving circuit 2 is received or when the out of synchronization alarm from the cell synchronization circuit 3 is received, the transmission line failure detecting circuit 4 makes judgement of failure of the transmission line after receiving. Then, the transmission line failure detecting circuit 4 supplies a transmission line failure alarm to the OAM transmission interval control circuit 5. The transmission line failure detecting circuit 4 also supplies the transmission line failure alarm to the selection circuit 9, when it makes a judgement that there is a failure of the transmission line. The transmission line failure alarm is supplied sequentially while failure is maintained and is terminated when the failure is removed. While the transmission line failure alarm is not supplied from the transmission line failure detecting circuit 4, the selection circuit 9 selects the cells transmitted form the cell synchronization circuit 3. The selection circuit 9 selects the cell from the OAM cell generator circuit 8 while the transmission line failure alarm is supplied as explained hereafter. However, the selection circuit 9 selects the idle cells from the idle cell generation circuit 10 when there is no cell to be transmitted, in both situations outlined above.

OAM cell transmission interval control circuit 5 activates the table scanning circuit 7 as soon as the transmission line failure alarm is received. The table scanning circuit 7 is responsive to an activation signal from the OAM cell transmission interval control circuit 5, to start operation. In the operation, the table scanning circuit 7 performs initialization (steps 51, 52), performs scanning for VP table 6 in order from the leading address (step 53), and inspects whether the virtual paths corresponding to respective of words are in use or not (step 54). Through this inspection, when virtual path being in use is found, the table scanning circuit 7 feeds VPI of the found virtual path to the OAM cell generating circuit 8 to command generation of OAM cell representative of VP-AIS. Simultaneously, the table scanning circuit 7 temporarily interrupts scanning for the VP table 6. The OAM cell generation circuit 8 is responsive to the command from the table scanning circuit 7 commanding generation of OAM cell representative of VP-AIS, to generate the OAM cell of the VP-AIS including the VPI of the found virtual path in the header. The header of this OAM cell include an identifier which contains the VPI of the found virtual path and includes an identification as the OAM cell. In the information field of this OAM cell includes an identifier indicative that the virtual path is in VP-AIS condition. Generated OAM cell is output to the output transmission line 11 through the selection circuit 9 (step 55). On the other hand, at the same time of starting of transmission of the OAM cell, the table scanning circuit 7 sets next address and resumes scanning for the VP table 6 (steps 56, 57, 53). When another virtual path being in use is found in this scan (step 54), the OAM cell including VPI of the found virtual path in the similar manner to that set forth above (step 55). In such case, when the next virtual path being in use is found within the transmission period of OAM cell which is generated in immediately preceding process, the next OAM cell is transmitted immediately after termination of transmission of the preceding OAM cell. However, in case that the virtual path being in use is not found within the transmission period of the OAM cell generated in the immediately preceding process, the next OAM cell is generated after finding of the virtual path being in use. During the interval between the transmission period of the preceding OAM cell and the next OAM cell, idle cells generated by the idle cell generation circuit 10 is transmitted. By repeating the foregoing operation until the final address of the VP table 6 is scanned (step 57), OAM cell containing VP-AIS for all virtual paths being in use to the output transmission line 11, immediately after occurrence of failure. When scanning on the VP table 6 is completed, the table scanning circuit 7 transmits a scan completion signal to the OAM cell transmission interval control circuit 5. The OAM cell transmission interval control circuit 5 is responsive to the scan completion signal, to immediately transmit a command for second cycle of table scanning to the table scanning circuit 7 (step 58). In response to this command, the table scanning circuit 7 again stars scanning on the VP table 6 to transmit the OAM cells for second transmission of OA cells containing VP-AIS for all virtual paths being in use (steps 52 through 59). After completion of transmission of the second OAM cells, the table scanning circuit 7 transmits the scan completion signal to the OAM cell transmission interval control circuit 5. The OAM cell transmission interval control circuit 5 is responsive to the scan completion signal, to immediately transmit a command for third cycle of table scanning to the table scanning circuit 7 (step 58). In response to this command, the table scanning circuit 7again stars scanning on the VP table 6 to transmit the OAM cells for third transmission of OAM cells containing VP-AIS for all virtual paths being in use (steps 52 through 59). Through the process set forth above, three OAM cells containing VP-AIS for each virtual paths are output concentrically in a short period, immediately after occurrence of failure in the transmission line. The three OAM cells containing VP-AIS for each virtual path is transmitted with intervals irrespective of an average cell transfer interval assigned for each virtual path. Therefore, in concentric transmission of three OAM cells within short period, there is a possibility that the transmission rate of OAM cell for transmission of VP-AIS exceeds the assigned transmission rate of the virtual path in case of the virtual path having low transmission rate. However, it is typical to provide a capacity margin for the buffer provided in the transmission line. Therefore, when the condition, in which the transmission rate of the OAM cell exceeds the average transmission rate of the virtual path, is terminated within a short period, disturbing of bands of other virtual paths will not be caused.

After completion of transmission of OAM cells in the third cycle, the table scanning circuit 7 transmit the scan completion signal to the OAM cell transmission interval control circuit 5.

The OAM cell transmission interval control circuit 5 is responsive to the third scan completion signal to active internal timer counter therein for measuring one second (step 60). During the period, in which the internal timer counter of the OAM cell transmission interval control circuit 5 measures one second period, the idle cells generated by the idle cell generation circuit 10 are transmitted. After expiration of the one second period as measured by the timer counter of the OAM cell transmission interval control circuit 5, check is performed whether the failure of the transmission line is recovered (step 61). When the transmission line is still maintained in faulty condition, the OAM cell transmission interval control circuit 5commands table scanning for the table scanning circuit 7 (step 62). Then, in the similar manner as set forth above, the table scanning circuit 7 performs scanning on the VP table 6 to transmit OAM cells containing VP-AIS for all virtual paths being in use (steps 63 though 67). After completion of transmission of OAM cells, the table scanning circuit 7 transmits the scan completion signal to the OAM cell transmission interval control circuit 5. The OAM cell transmission interval control circuit 5 is responsive to the scan completion signal, to restart measurement for the one second period (step 68). Similarly to the above, during this one second period, the idle cells generated by the idle cell generation circuit 10 is transmitted. After expiration of the one second period, check is again performed whether the failure of the transmission line is recovered (step 69). When the transmission line is still in faulty condition, another OAM cells containing VP-AIS are again transmitted for all virtual paths being in use (steps 62 through 69).

Figure 5:
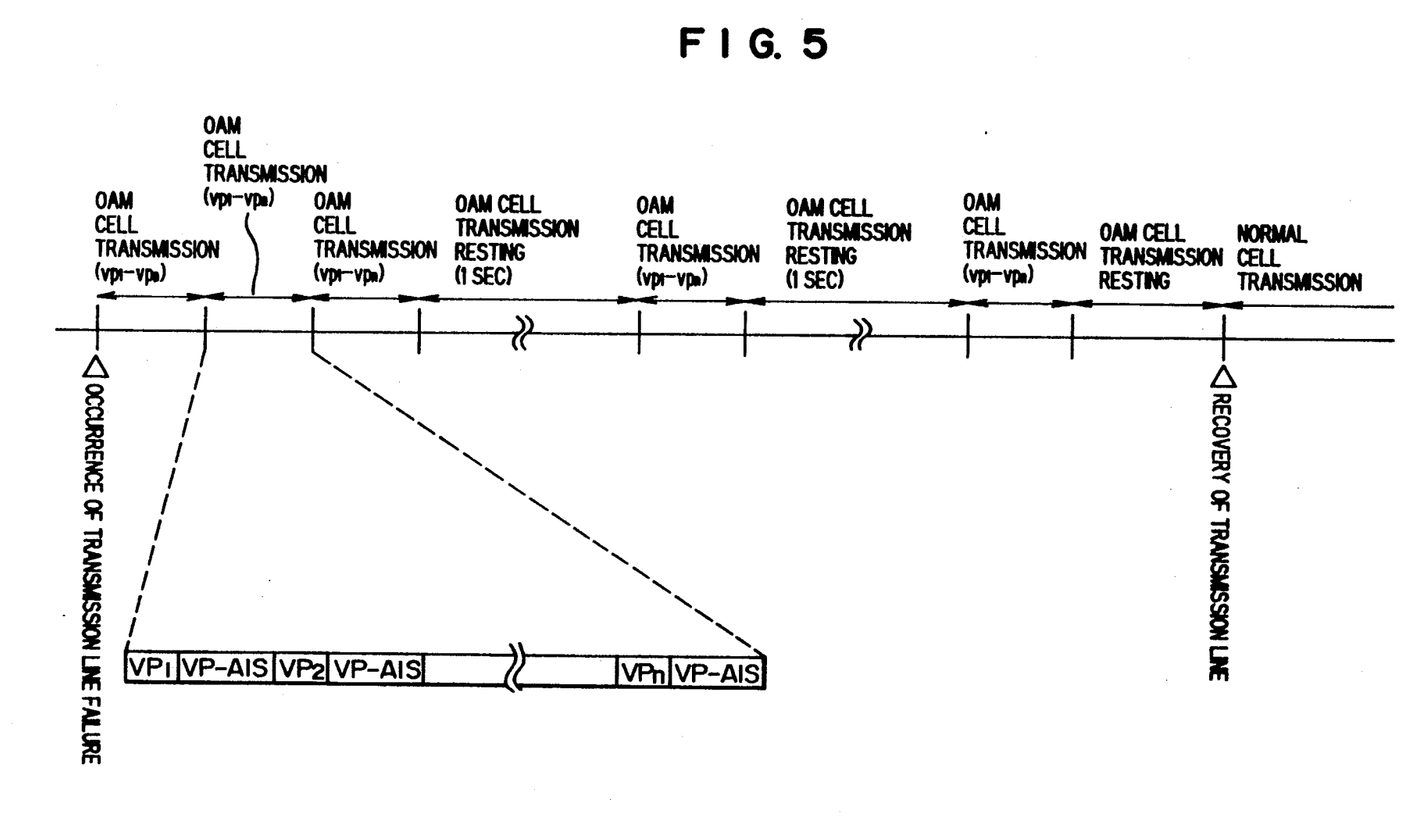
FIG. 5 is an illustration of a transmission format of OAM cell in the first embodiment.

As set forth above, while the transmission line failure alarm is maintained, OAM cells containing VP-AIS is repeated about every one second for all of the virtual paths being in use. When the transmission line failure alarm is terminated, the OAM cell transmission interval control circuit 5 and the table scanning circuit 7 terminates operation regardless of the operational states thereof. Then, the normal cell received through the input transmission line 1 is transmitted to the output transmission line 11. With the operation set forth above, at the occurrence of failure on the transmission line, the OAM cells containing VP-AIS are transmitted at the timing as illustrated in FIG. 5. Namely, after occurrence of failure in the transmission line, for n of virtual paths VP1 to VPn which are in use, OAM cells are sequentially transmitted in order for three times. Thereafter, as long as the failure of the transmission line is maintained, the OAM cells are repeatedly transmitted with an interval of about one second for n of virtual paths VP1 to VPn being in use.

According to the shown embodiment, since the OAM cells carrying VP-AIS are sequentially transmitted to the all virtual paths being in use for three times immediately after occurrence of failure of the transmission line, the downstream devices can certainly receive the initially transmitted OAM cells carrying the VP-AIS because two may be received even when one is overlooked. Therefore, failure of the virtual path can be certainly and quickly detected. Furthermore, since the OAM cells are transmitted for respective of virtual paths with about one second interval, in the shown embodiment. Such frequency to approximately 0.5 bit/sec of transmission rate which is sufficiently low in comparison with the possible band of the virtual paths, it will never occur to disturb the bands of other normal virtual paths.

Although check as to whether the failure of the transmission line is removed or not, is performed at the steps 61 and 69 in the process of FIG. 4, check is practically performed continuously. Therefore, when failure is removed, the operational mode can be instantly switched into the normal cell transmission mode.

Figure 6:
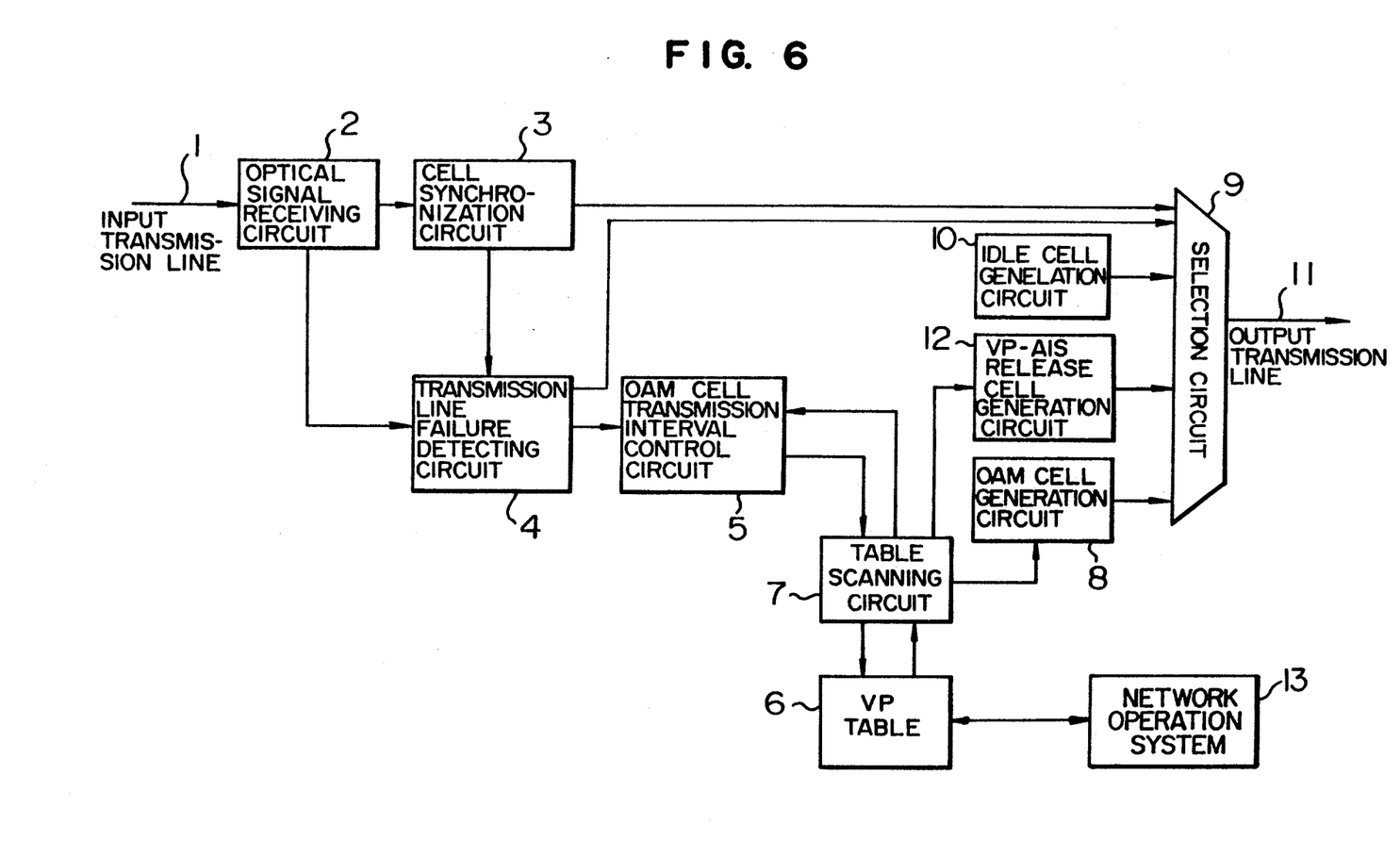
FIG. 6 is a block diagram of the second embodiment of the present invention.

The second embodiment of the present invention will be discussed here below with reference to FIG. 6. The transmission device in FIG. 6 comprises the input transmission line 1, the optical signal receiving circuit 2, the cell synchronization circuit 3, the transmission line failure detecting circuit 4, the OAM cell transmission interval control circuit 5, the VP table 6, the table scanning circuit 7, the OAM cell generation circuit 8, the selection circuit 9, the idle cell generation circuit 10, the output transmission line 11 and the VP-AIS releasing cell generation circuit 12. The content in the VP table 6 is identical to that of the first embodiment.

Figure 7:
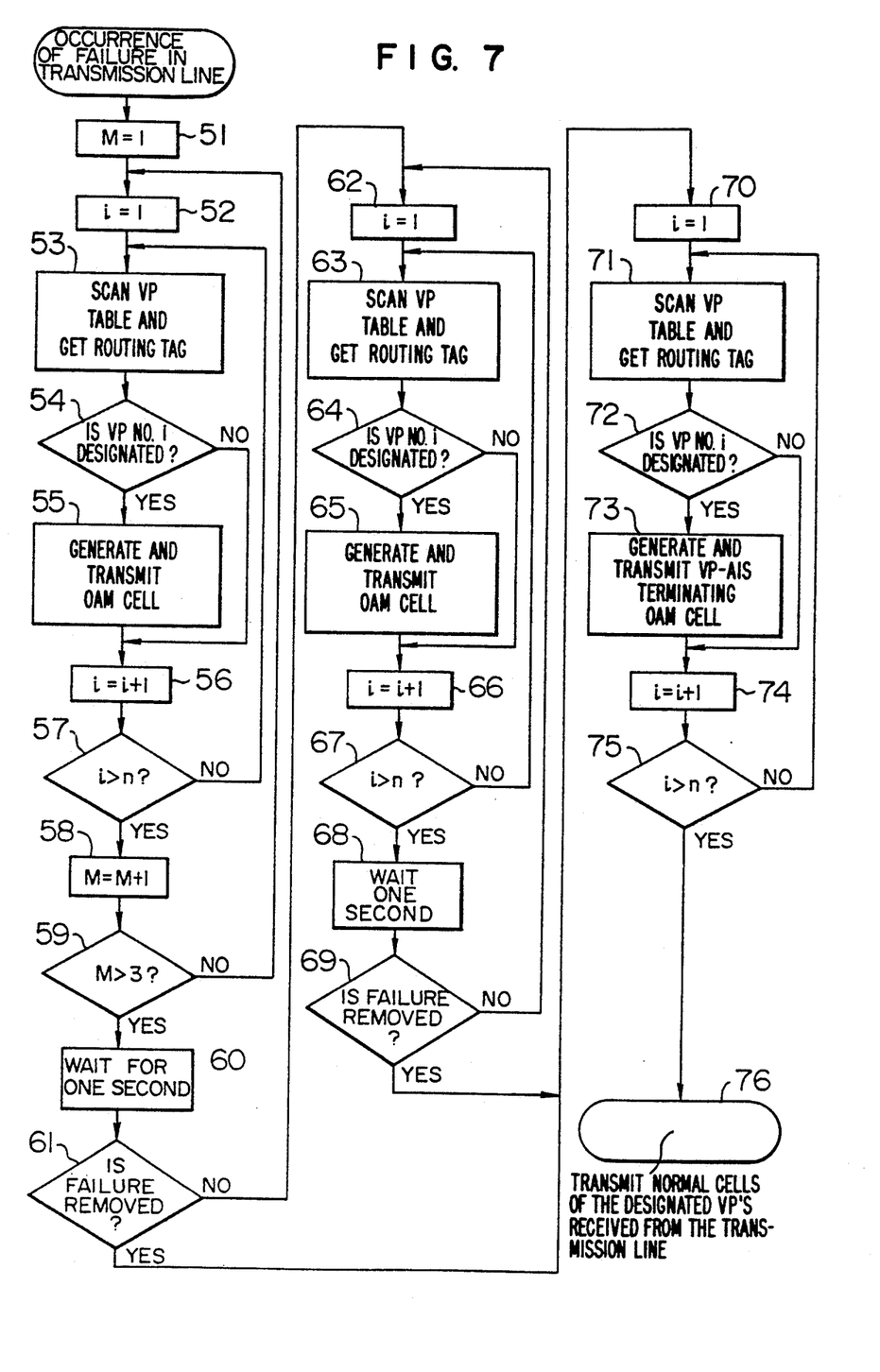
FIG. 7 is a flowchart showing operation of the circuit of FIG. 6.
Figure 8:
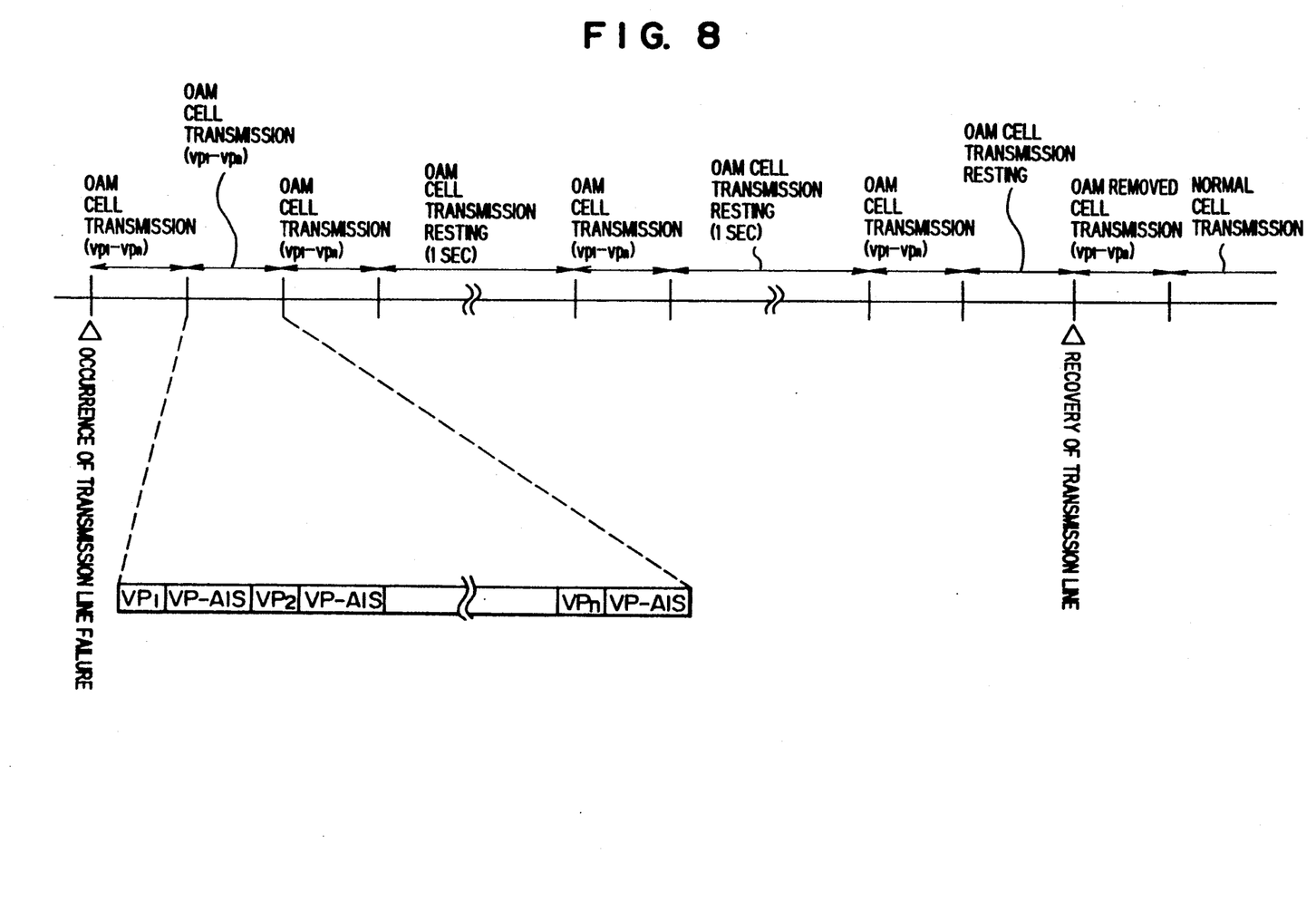
FIG. 8 is an illustration showing transmission format of OAM cell in the second embodiment.

The operation of the second embodiment will be discussed herebelow. The operations to sequentially transmit the OAM cells containing VP-AIS for three times upon occurrence of failure of the transmission line, and intermittently transmit the OAM cells with the interval of about one second as long as the failure of the transmission line is maintained, are performed substantially in the same manner to that in the first embodiment. In the second embodiment, the operation when the failure of the transmission line is removed, is differentiated from that in the first embodiment. When the transmission line failure alarm is terminated, the OAM cell transmission interval control circuit 5 and the table scanning circuit 7 terminates operation regardless of the operational states thereof. Then, the OAM cell transmission interval control circuit 5 commands scanning on the VP table 6 from the leading address to the table scanning circuit 7 (step 70). The table scanning circuit 7 feeds VPI of the virtual path being in use, which is found during scanning, to the VP-AIS release cell generation circuit 12, in order (step 72). The VP-AIS release cell generation circuit 12 generates each one OAM cell representative of termination of VP-AIS for each of the virtual cells to transmit to the output transmission line 11 through the selection circuit 9 (step 73). This operation is repeated until the final address of the VP table 6 is scanned(steps 71 through 75). Therefore, as shown in FIG. 8, immediately after recovery of the transmission line, the OAM cells indicative of termination of VP-AIS are transmitted for all virtual ells being in use. Thereafter, the operation is returned to the normal mode in which the normal cells of the virtual paths received from the input transmission line 1 are transmitted to the output transmission line 11.

As similarly to the first embodiment, in the second embodiment, the check as to whether the failure of the transmission line is removed or not, is performed at every time. When the recovery of the transmission line is detected, steps 70-76 are immediately carried out.

According to the second embodiment, since the OAM cells indicative of VP-AIS termination for the downstream devices in the virtual paths immediately after recovery of the transmission line, it can be avoided t fail detection of termination of VP-AIS until the normal cell is received, in the downstream device and thus termination of VP-AIS can be quickly detected.

Although the dedicated table capable store whether the virtual paths are in use or not in use, is used for searching the virtual paths being in use in the foregoing first and second embodiments, it may be possible to perform the search for the virtual paths being in use utilizing a table for converting routine tag for the ATM switching system from the virtual path identifier. In such case, the routine tag will be stored in the addresses of the virtual paths being in use, and a code indicative of the non-use state will be stored in the addresses of the virtual paths not being in use.

What is claimed is:

1. A method for transmitting virtual path failure information in an asynchronous transfer mode network comprising:
    (a) a step of detecting a failure in a transmission line multiplexing virtual paths;
    (b) a step of generating failure indicative cells for notifying failures in said virtual paths caused by said failure in said transmission line;
    (c) a first transmission step of transmitting said failure indicative cells with a first rate for predetermined times for other apparatuses which are connected in downstream directions of said virtual paths; and
    (d) a second transmission step of transmitting said failure indicative cells with a second rate lower than said first rate as long as said failure in said transmission line is maintained, after sequential transmission of said failure indicative cells for said predetermined times.

2. A method for transmitting failure information as set forth in claim 1, which further comprises:
    a step of continuously checking presence of said failure in said transmission line; and
    a step of transmitting normal cells received from said transmission line upon recovery of said transmission line.

3. A method for transmitting failure of information as set forth in claim 2, wherein said step of transmitting normal cells received from said transmission line includes;
    a step of generating a failure termination indicative cell for notifying recoveries of said virtual paths caused by recovery of said transmission line; and
    a step of transmitting said failure termination indicative cell for said other apparatuses which are connected in downstream directions of said virtual paths.

4. A method for transmitting failure information as set forth in claim 1, wherein said second transmission step includes a step of transmitting said failure indicative cells at an interval of a predetermined period of time.

5. A method for transmitting failure information as set forth in claim 4, wherein said predetermined period of time is set at a larger value than an assigned average cell transfer interval of the virtual path which has a maximum value of the average cell transfer interval among said virtual paths.

6. A method for transmitting failure information as set forth in claim 1, wherein said step of generating said failure indicative cells includes
    a step of scanning a table storing information as to whether each of said virtual paths is designated; and
    a step of generating said failure indicative cells corresponding to said virtual paths being designated.

7. A method for transmitting failure information as set forth in claim 6, wherein said step of scanning said table includes a step of searching routing tags from input virtual path identifiers (VPI).

8. A method for transmitting virtual path failure information in an asynchronous transfer mode network comprising:
    (a) a step of generating failure indicative cells for notifying failures in virtual paths multiplexed in a transmission line, caused by a failure in said transmission line when said failure of said transmission line is detected;
    (b) a step of transmitting said failure indicative cells for other apparatuses which are connected in downstream directions of said virtual paths; and
    (c) a step of transmitting normal cells received from said transmission line for said other apparatuses which are connected in downstream directions of said virtual paths when said detection of said failure in said transmission line is over.

9. A method for transmitting virtual path failure information in an asynchronous transfer mode network comprising:
    (a) a step of generating failure indicative cells for notifying failures in virtual paths multiplexed in a transmission line, caused by a failure in said transmission line when said failure of said transmission line is detected;

(b) a step of transmitting said failure indicative cells for other apparatuses which are connected in downstream directions of said virtual paths;

(c) a step of generating failure termination indicative cells for notifying recovery from said failure in said virtual paths when said detection of said failure in said transmission line is over; and (d) a step of transmitting each one failure termination indicative cell for each of said other apparatuses which are connected in downstream directions of said virtual paths.

10. An apparatus for transmitting virtual path failure information in an asynchronous transfer mode network comprising:

(a) means for detecting a failure in a transmission line multiplexing virtual paths;

(b) means for generating failure indicative cells for notifying failures in said virtual paths caused by said failure in said transmission line;

(c) a first transmission means for transmitting said failure indicative cells with a first rate for predetermined times for other apparatuses which are connected in downstream directions of said virtual paths; and (d) a second transmission means for transmitting said failure indicative cells with a second rate lower than said first rate as long as said failure in said transmission line is maintained, after sequential transmission of said failure indicative cells for said predetermined times.

11. An apparatus for transmitting failure information as set forth in claim 10, which further comprises:

means for transmitting normal cells received from said transmission line when said detection of said failure in said transmission line is over.

12. An apparatus for transmitting failure information as set forth in claim 11, wherein said means for transmitting normal cell includes:

means for generating a failure termination indicative cell for notifying recoveries of said virtual paths caused by said recovery of said transmission line; and means for transmitting said failure termination indicative cells for said other apparatus which are connected in downstream directions of said virtual paths.

13. An apparatus for transmitting failure information as set forth in claim 10, wherein said second transmission means includes means for determining periods of time of said failure indicative cells transmission period and transmission resting period.

14. An apparatus for transmitting failure information as set forth in claim 10, wherein said means generating said failure indicative cells includes a table storing use and non-use of said virtual paths;

means for scanning said table; and means for generating said failure indicative cells corresponding to said virtual paths being in use.

15. An apparatus for transmitting failure information as set forth in claim 14, wherein said means for scanning said table includes means for searching routine tags from input virtual path identifiers (VPI).

16. An apparatus for transmitting virtual path failure information in an asynchronous transfer mode network comprising:

(1) means for detecting a failure in a transmission line multiplexing virtual paths;

(2) means for generating failure indicative cells for notifying failures in said virtual paths caused by said failure in said transmission line;

(3) means for determining periods of time concerning transmission period and transmission resting period of said failure indicative cells;

(4) a table storing information concerning designation of said virtual paths;

(5) means for scanning said table in order to get designated virtual paths; and (6) means for transmitting said failure indicative cells for other apparatuses which are connected in downstream directions of said designated virtual paths with said periods of time.

* * * * *